US006643741B1

United States Patent
Shuf et al.

(10) Patent No.: US 6,643,741 B1
(45) Date of Patent: Nov. 4, 2003

(54) METHOD AND APPARATUS FOR EFFICIENT CACHE MANAGEMENT AND AVOIDING UNNECESSARY CACHE TRAFFIC

(75) Inventors: Yefim Shuf, Forest Hills, NY (US); Hubertus Franke, Courtlandt Manor, NY (US); Manish Gupta, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 09/636,048

(22) Filed: Aug. 10, 2000

Related U.S. Application Data

(60) Provisional application No. 60/198,406, filed on Apr. 19, 2000.

(51) Int. Cl.[7] .............................................. G06F 12/06
(52) U.S. Cl. .................... 711/135; 711/156; 711/141
(58) Field of Search ................................. 711/133, 141, 711/144, 143, 146, 156, 120, 135

(56) References Cited

U.S. PATENT DOCUMENTS

| | | | | | |
|---|---|---|---|---|---|
| 4,463,420 A | * | 7/1984 | Fletcher | ....................... | 711/133 |
| 5,155,824 A | * | 10/1992 | Edenfield et al. | ........... | 711/143 |
| 5,692,149 A | * | 11/1997 | Lee | ............................. | 711/133 |
| 5,907,672 A | * | 5/1999 | Matze et al. | ................. | 711/162 |
| 5,956,709 A | * | 9/1999 | Xue | ................................ | 707/3 |
| 5,991,854 A | * | 11/1999 | Watkins | ....................... | 711/135 |
| 6,185,658 B1 | * | 2/2001 | Arimilli et al. | ............. | 711/133 |
| 6,289,419 B1 | * | 9/2001 | Takahashi | .................... | 711/118 |
| 6,370,621 B1 | * | 4/2002 | Keller | .......................... | 711/141 |
| 6,378,047 B1 | * | 4/2002 | Meyer | ......................... | 711/135 |
| 6,467,029 B1 | * | 10/2002 | Kitayama | .................... | 711/135 |

OTHER PUBLICATIONS

Jim Handy, "The Cache Memory Book 2nd edition", Academic Press, New York, 1998, pp. 64–67, 138–139, 144–146.*

* cited by examiner

*Primary Examiner*—Pierre-Michel Bataille
(74) *Attorney, Agent, or Firm*—Scully, Scott, Murphy & Presser; Douglas W. Cameron

(57) ABSTRACT

The invention teaches how to reduce the traffic associated with handling cache lines containing useless data (i.e. cache lines corresponding to pages that have been invalidated). The invention makes it possible to evict such cache lines earlier, to avoid write backs of useless data from such cache lines to main memory, and to avoid transmitting useless data from such cache lines to the requesting remote coherence controller in a multiprocessor system. The present invention describes a mechanism for invalidating cache lines containing useless data transparently and without programmer's involvement. For efficiency, the content of a cache line containing useless data is invalidated only when the line is referenced or is about to be allocated for some new data.

25 Claims, 6 Drawing Sheets

METHOD AND APPARATUS FOR EFFICIENT CACHE MANAGEMENT AND AVOIDING UNNECESSARY CACHE TRAFFIC

RELATED APPLICATION

This application claims the benefit of provisional application No. 60/198,406, filed Apr. 19, 2000 and now abandoned.

BACKGROUND OF THE INVENTION

1. Field of the Invention

This invention generally relates to the management of caches in a computer system. Namely, this invention relates to a method and an apparatus for reducing memory traffic between various components of a memory subsystem (e.g. between a write buffer and main memory, between a cache and main memory, and between processors in a multiprocessor system). More specifically, the present invention relates to a mechanism for avoiding unnecessary cache traffic related to handling cached data corresponding to pages marked as containing useless data (e.g. invalidated pages).

2. Discussion of the Prior Art

Frequently, a program generates and modifies data which at some point in time (even long before program completion) become absolutely "useless" for that program. In a memory constraint environment, it is not unlikely for a page containing such useless (modified) data to be swapped out from main memory to a disk. There exist several techniques (e.g. DIAGNOSE X'214' Pending Page Release call available on IBM s/390 and a mechanism described in copending application Ser. No. 09/636,049, filed Aug. 10, 2000, for "A Method and Apparatus for Efficient Virtual Memory Management"), the disclosure of which is herein, incorporated by reference) enabling a program to indicate to the OS whether the contents of certain pages (e.g. those containing only useless data) can be safely discarded (i.e. invalidated) should those pages be selected for eviction. The content of a page marked as invalid (useless) need not be written back to a disk even if the page is in a modified state. (The terms "modified" and "dirty" will be used interchangeably.)

However, when a page is invalidated, it is possible that some data (dirty or clean) associated with that page still resides in a processor cache (e.g. in a large write-back cache). This data is useless and occupies valuable cache resources. Moreover, handling this useless data (especially the data in a modified/dirty state) causes needless overhead:

a) Specifically, sooner or later, modified (dirty), useless data will be evicted from a cache (as a result of a cache line replacement while servicing a cache miss) and placed into a write buffer[2]. From a write buffer, the data is written back to memory. Writing this data to memory generates unnecessary traffic on a memory bus. Because write buffers tend to be small, they can easily get filled with useless data.

b) In addition, in a set associative cache, a cache line containing useful data (i.e. the data that will be used in the future) can be replaced before a cache line (from the same set) containing useless (dirty or clean) data (e.g. according to the least recently used replacement policy). If the useful data is in a modified state, it will have to be written back to memory. Later on, as a result of a cache miss, the useful data will have to be re-fetched from memory. Re-fetching that useful data generates unnecessary traffic on a memory bus. Hence, in a set-associative cache, a cache line containing useful data can sometimes be evicted before a cache line (in the same set) containing useless data.

c) Also, in a multiprocessor system (e.g. a shared memory multiprocessor, if some processor other than the one currently controlling the invalidated page (i.e. a page containing useless data) gets the control of the invalidated page and starts initializing that page with new data., some useless data (dirty or clean) may be sent across a bus (or some other interconnect), by a coherence controller to that requesting processor (i.e. the processor performing the initialization of that page and hereby requesting cached data from that page be transmitted to it). Hence, in a multiprocessor system (e.g. a shared memory multiprocessor), a coherence controller sometimes transmits useless data to a requesting processor.

The instruction sets of many microprocessors include instructions for managing on-chip (or local) instruction and data caches. Some of these instructions (privileged instructions) are only available to the supervisor-mode processes due to their destructive effect while others can be used-by user-level processes for effective cache management. For example, the following cache management instruction is implemented in PowerPC 604e:

DCBI (Data Cache Block Invalidate) is a supervisor-level (privileged) instruction due to the fact that it discards and invalidates the data stored in the cache block whether it is in clean (exclusive or shared) or in modified states. Once the data is invalidated, other processors on the same bus are instructed to invalidate the specified cache block.

Note that it is the responsibility of a programmer to invalidate cache lines containing useless data. A single instruction can invalidate at most one line. Hence, a number of such instructions must be issued to invalidate multiple cache lines (associated with a page). Finally, a supervisor-level (priviledged) instruction cannot be used by a user-level program.

SUMMARY OF THE INVENTION

From a correctness standpoint, cache lines containing useless data (i.e. cache lines corresponding to pages that have been invalidated) do not have to be kept around, written back to memory, or transmitted to a (remote) requesting processor upon request.

Therefore, an object of this invention is a method and an apparatus for reducing memory traffic between various components of a memory subsystem (e.g. between a write buffer and main memory, between a cache and main memory, and between processors in a multiprocessor system).

The invention reduces the traffic associated with handling cache lines containing useless data (i.e. cache lines corresponding to pages that have been invalidated). The invention makes it possible to do the following: to evict such cache lines earlier than when they would have been evicted according to an implemented replacement policy; to avoid write backs of useless data from such cache lines to main memory; and to avoid transmitting useless data from such cache lines to a requesting processor in a multiprocessor system.

The present invention describes a mechanism for invalidating cache lines containing useless data transparently and without programmer's involvement. For efficiency, the content of a cache line containing useless data is invalidated only when the line is referenced or is.about to be allocated for some new data.

One aspect of the present invention is an invalid page ID buffer. (IPIDB) containing the IDs of pages that have been invalidated (i.e. pages containing useless data).

Another aspect of this invention is a memory traffic saver device coupled with a write buffer. This device monitors a write buffer and uses the information from the invalid page ID buffer (IPIDB) to remove those entries from a write buffer that are associated with pages that have been invalidated (i.e. pages containing useless data) and not writing the data in those entries to main memory.

Another aspect of the present invention is a memory traffic saver device coupled with a cache controller. This device examines a set from which a cache line is about to be evicted and uses the information from the invalid page ID buffer (IPIDB) to evict those cache lines first that are associated with pages that have been invalidated (i.e. pages containing useless data). The content of evicted cache lines with useless data is discarded and not written to memory.

Another aspect of the present invention is a memory traffic saver device coupled with a coherence controller. This device examines requests received by a local coherence controller from a remote coherence controller for some data to be transmitted and uses the information from the invalid page ID buffer (IPIDB) to avoid transmitting to the requesting party the data from those cache lines that are associated with pages that have been invalidated (i.e. pages containing useless data) and, at the same time, invalidates those cache lines in a local cache.

DETAILED DESCRIPTION OF THE PREFERRED EMBODIMENTS

Figure 1:
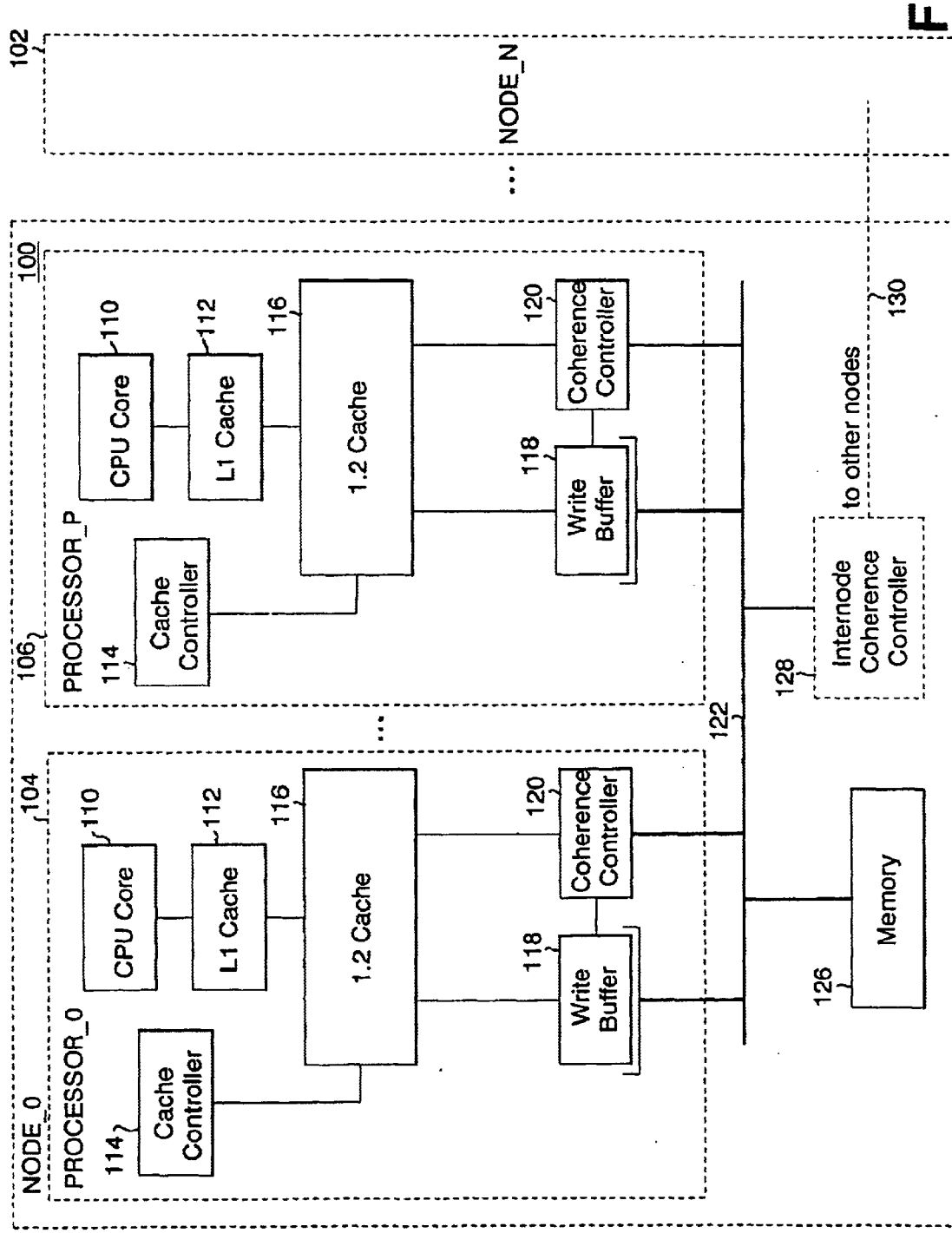
FIG. 1 is a block diagram of a memory hierarchy in a typical computer system on which a preferred embodiment of the present invention operates.
Figure 2:
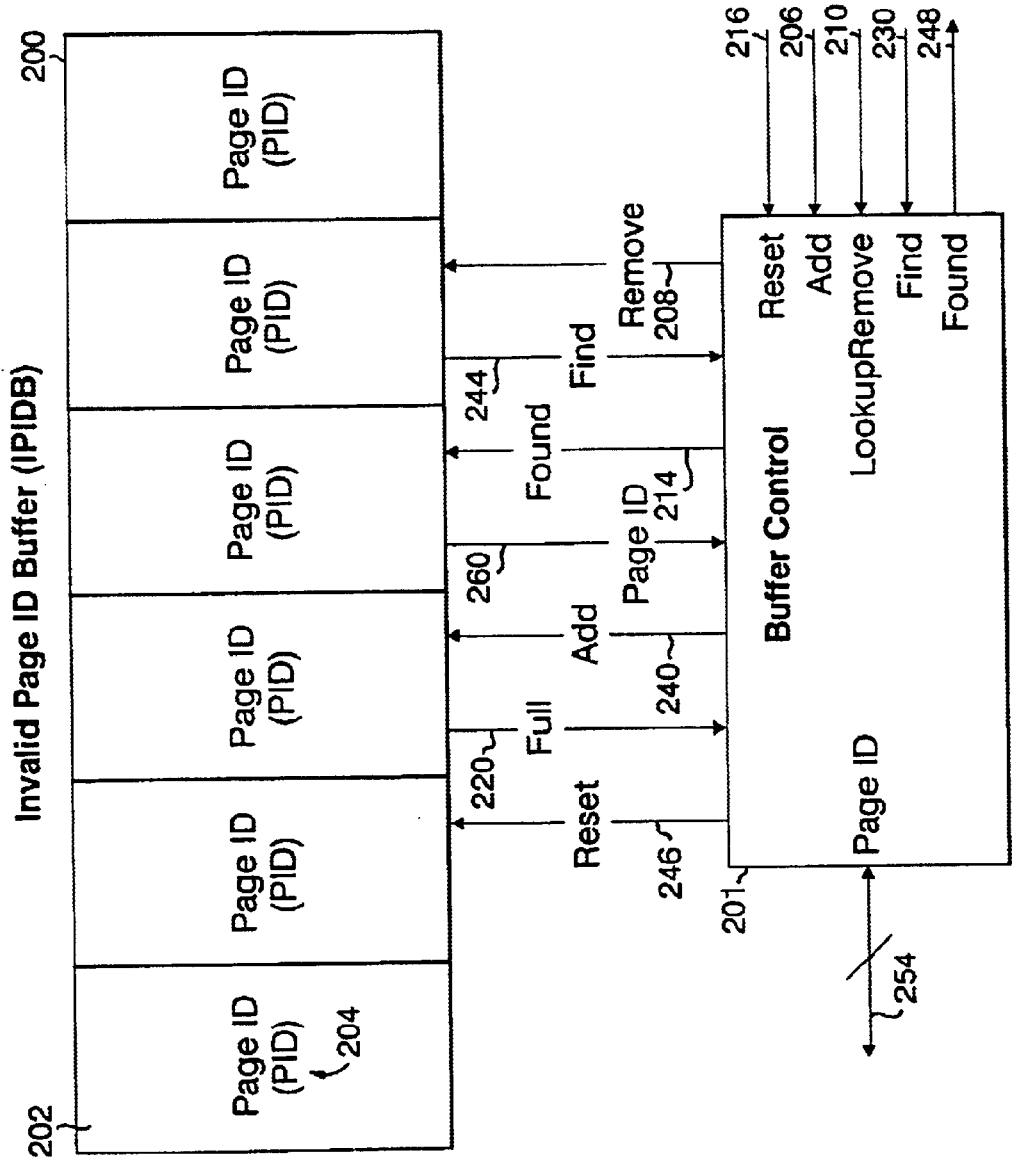
FIG. 2 is a block diagram showing an Invalid Page ID Buffer (IPIDB) whose entries contain the identities (IDs) of some number of pages which have been invalidated (marked as containing useless data), and an apparatus controlling the buffer.
Figure 3:
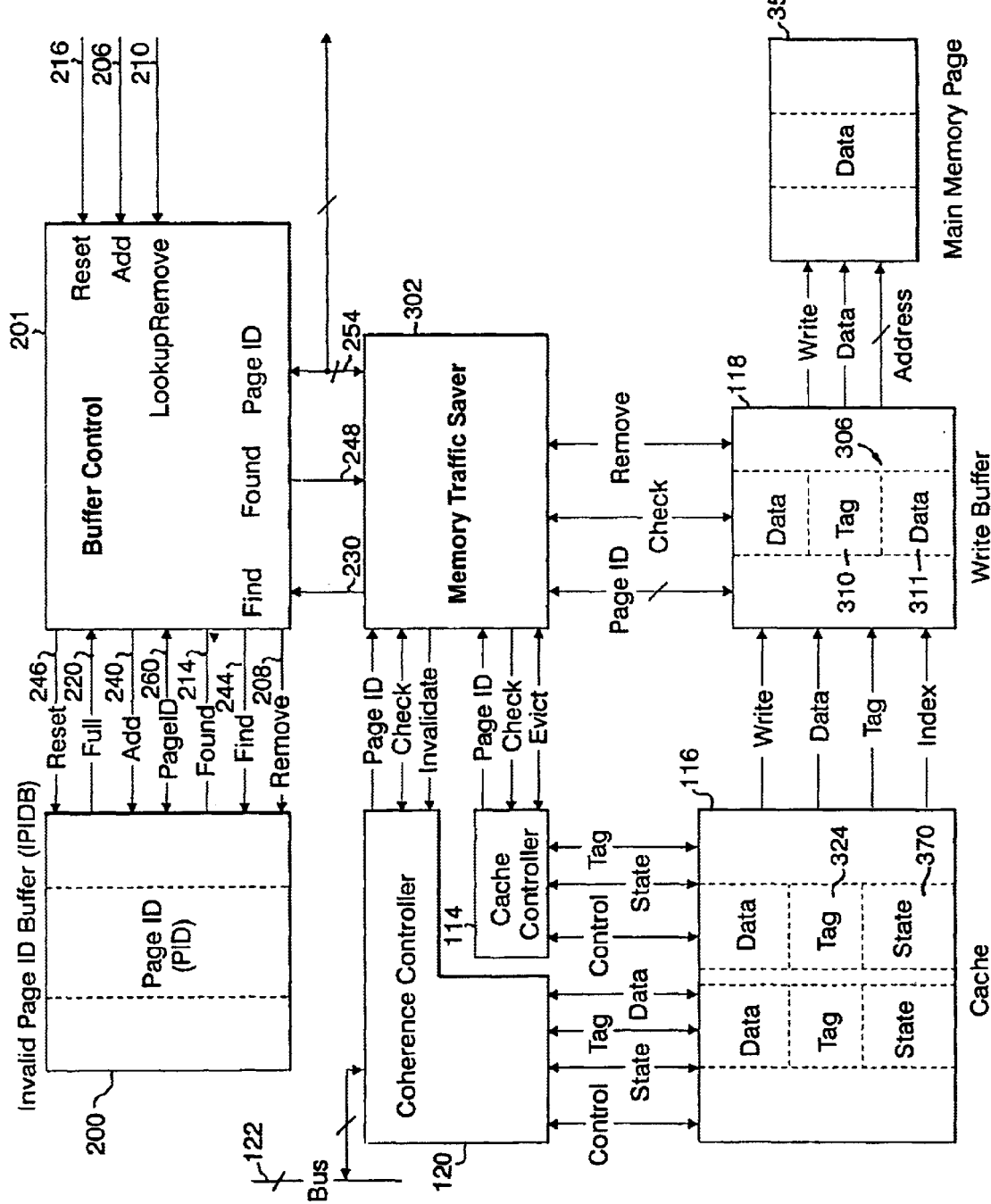
FIG. 3 is a block diagram showing a memory traffic saver apparatus and its interactions with a write buffer, a cache controller, a coherence controller, and an Invalid Page ID Buffer (IPIDB) through its buffer control.
Figure 4:
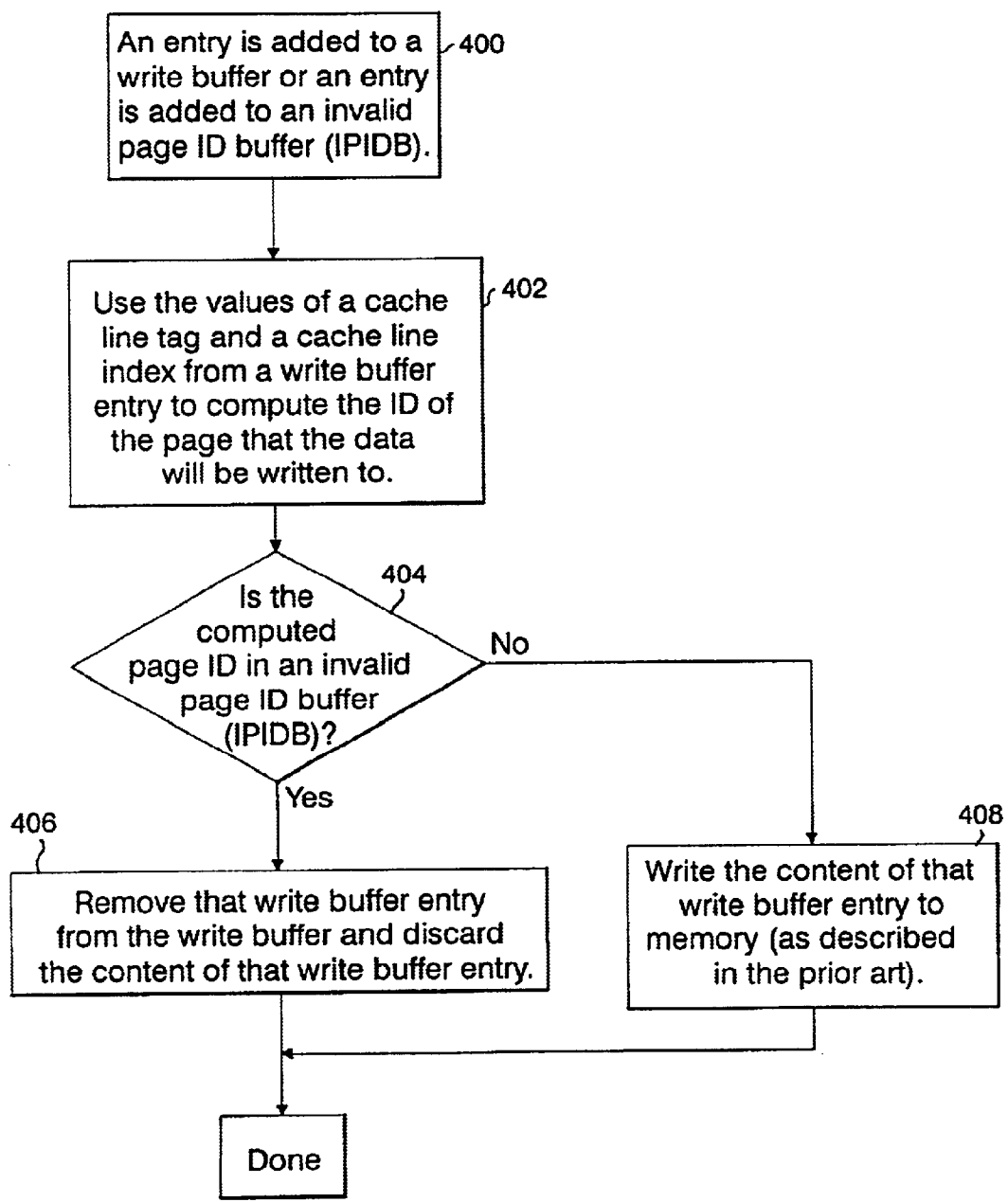
FIG. 4 is a flow chart showing the logic of a memory traffic saver device coupled with a write buffer.
Figure 5:
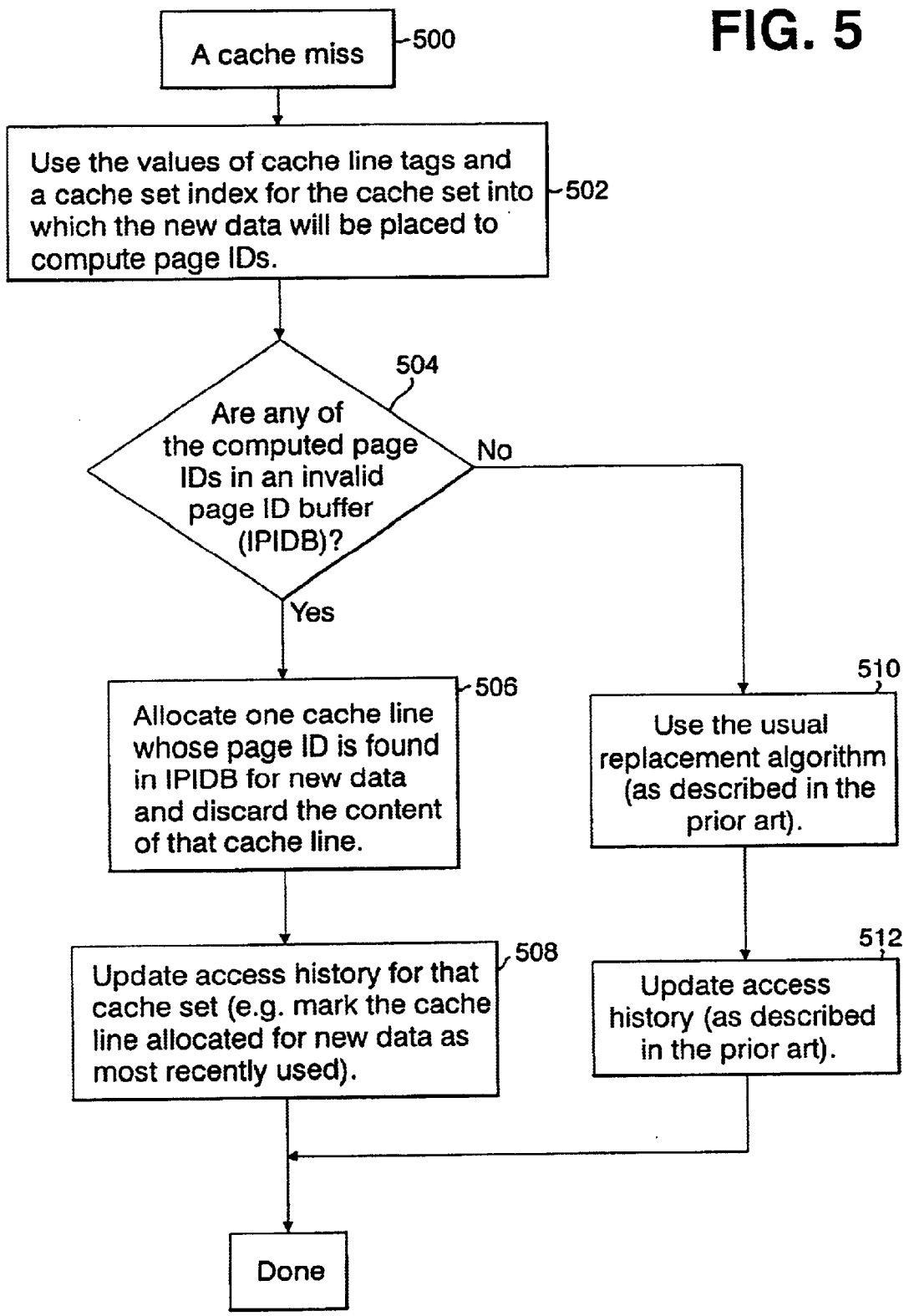
FIG. 5 is a flow chart showing the logic of a memory traffic saver device coupled with a cache controller.
Figure 6:
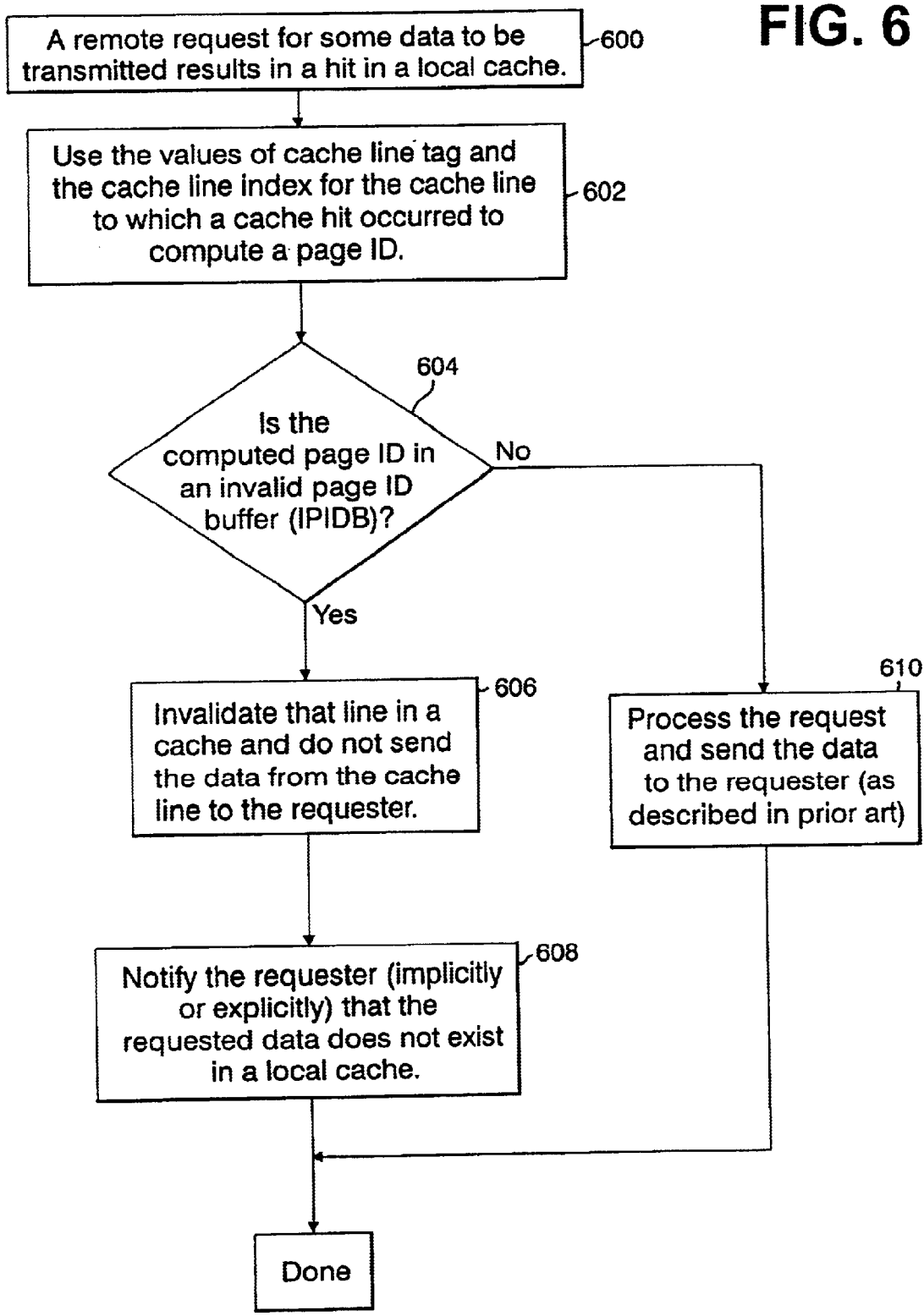
FIG. 6 is a flow chart showing the logic of a memory traffic saver device coupled with a coherence controller.

FIG. 1 is a high-level block diagram showing a memory hierarchy in a typical multiprocessor computer system built of one (100) or more (102) computing nodes. Each node has one (104) or more processors (106) and some memory (126). Each processor has a CPU core (110). One (112) or more (116) levels of caches may be implemented. Caches are used to keep some recently and frequently referenced data locally (i.e. closer to the processor core). Caches are controlled by cache controllers (114). Caches (116) of different processors such as (104) and (106) are kept coherent by coherence controllers (120). Coherence controllers (120) are connected to a bus (122).

In addition, write buffers (118) may be implemented. In a system with multiple modes, nodes (e.g. (100) and (102)) are connected to each other through internode coherence controllers (128) and some kind of interconnect (130).

The computer system shown in FIG. 1 illustrates the general architecture of a computer system to which this present invention is applicable but not limited to. It is understood that this invention applies to other architectures comprising a memory hierarchy (depicted in FIG. 1) as well as various controllers for attaching communication devices (e.g. terminals with keyboards, modems, networks, etc.), external storage devices (e.g. hard drives, CD-ROM drives, tape drives, flash memory cards, etc.), and other peripheral devices (printers, displays, etc.).

One aspect of the present invention is an invalid page ID buffer (IPIDB) (or simply a buffer) (200) (preferably in hardware) having a number of entries (202) and a buffer control (201). Each entry (202) in the buffer contains the identity of a page (204) (e.g. a physical page number and/or virtual page number) that has been invalidated (the content of such a page is useless). (In an alternate embodiment, in addition to a page ID, a buffer entry contains more information.) There exist several methods for indicating that the content of a page is useless and invalidating that page (e.g. the techniques proposed in) the above identified copending application Ser. No. 09/636,049 for "A Method and Apparatus For Efficient Virtual Memory Management. When a page is invalidated, an entry containing the identity of the corresponding page is passed (254) (260) to a buffer control (201) and is added (206) (240) to the buffer(200). If all entries are full (220) (i.e. if no entry is available), one of the entries is removed (208) according to some policy (such as "first in, first out" or some other). (In an alternate embodiment, no entries are added once the buffer is full.) When a page whose identity is in a buffer becomes valid again, the corresponding entry is removed from a buffer and made available. This is accomplished via a Lookup-Remove (210) operation which attempts to find (244) an entry with page ID in question and if it is found (214), removes it (208). All entries in the buffer can be cleared (reset) (216) (246) when necessary.

In one embodiment, the buffer is memory mapped and is controlled with load and store instructions by a system software executing in a privileged mode. In another embodiment, the buffer is controlled by manipulating the content of special purpose registers.

In an alternate embodiment, other control signals are added to the buffer (200) and a buffer control (201).

In an alternate embodiment, more than one instance of a buffer (200) and a buffer control (201) can be implemented (e.g. to reduce contentions).

Another aspect of this invention is a memory traffic saver apparatus (302) (implemented preferably in hardware) which is connected to a buffer (200) via a buffer control (201).

In the preferred embodiment, a memory traffic saver apparatus (302) is coupled with a write buffer (118). The purpose of this apparatus is to observe the content of a write buffer (118) to detect whether a write buffer entry (306) (which contains the data copied from a modified cache line of a cache (116)) to be written to memory, corresponds to a memory page (355) that has been invalidated. This is done whenever a new entry is added to a write buffer or a new entry is added to an invalid page ID buffer (400). A cache line (370) has a tag (324) associated with it. The tag along with a cache line index are transferred into a write buffer entry (306) when a cache line (370) is evicted from a cache (116).

The values of a tag (310) and an index (311) in a write buffer entry (306) are used to compute the address that the data will be written to. Similarly, they are used to compute (402) the identity of the page that the data will be written to. The apparatus (302) uses the computed identity of a page. (i.e. page ID) to try to find (230) an entry with the same page ID (254) in a buffer (200) in order to determine (404) whether that page has been invalidated.

If this is the case and such an entry is found (248), the data from such a write buffer entry (306) will not be written to main memory (and removed from a write buffer (118)) (406). Otherwise, that write buffer entry (306) is written to a main memory page (355) as usual (408).

In the preferred embodiment, a memory traffic saver apparatus (302) is also coupled with a cache controller (114) managing a set associative cache (116) (i.e. a cache with several cache lines in a set). (A direct mapped cache is one-way set associative cache with only one line in a set.) On a cache miss (500), the apparatus (302) examines tags (324) of a set into which the new data will be placed.

A page identity is computed (502) from a cache line tag (324) and a cache set index. The apparatus (302)uses the computed identity of a page (i.e. page ID) to try to find (230) an entry with the same page ID (254) in a buffer (200) in order to determine (504) whether a cache line is associated with a page that has been invalidated.

If one of the lines in a set is indeed associated with a page that has been invalidated (which is indicated by (248)), such a line is immediately allocated for the new data (and its content is discarded even if it is in a modified state and not passed to a write buffer (118) and, hence, not written to memory) (506). The line containing useless data is allocated for the new data and the access history is updated (e.g. the line where the new data will be placed is marked as the most recently used) (508). If no such line is found, a standard replacement algorithm (e.g. the least recently used) is employed to find a cache line to be evicted and then allocated for the new data (510); then, the access history,is updated as described in the prior art (512).

In the preferred embodiment, a memory traffic saver apparatus (302) is also coupled with a cache coherence controller (120) managing a cache (116). In response to a request received by a local coherence controller (120) for some data to be transmitted to a remote coherence controller (e.g. this situation may arise as a result of Bus-Read or Bus-Read-Exclusive transactions in a multiprocessor system with the MESI protocol), the coherence controller (120) verifies whether the data in question is in a cache (116). If the data if found (i.e. on a cache hit (600)), the apparatus (302) examines the value of the tag (324) of the cache line that contains the data.

A page identity is computed (602) from the values of a cache line tag (324) and a cache line index. The memory traffic saver apparatus (302) uses the computed identity of a page (i.e. page ID) to try to find (230) an entry with the same page ID (254) in a buffer (200) in order to determine (604) whether a requested cache line is associated with a page that has been invalidated (i.e. a page whose content is useless).

If the requested cache line is indeed associated with a page that has been invalidated (which is indicated by (248)), such a line is immediately invalidated in a local cache and the data from that line are not sent (across the bus (122) or interconnect (130) to the processor requesting the data (e.g. the processor performing the initialization of that page,and hereby requesting cached data from that page be transmitted to it) (606). The requesting processor is notified that the requested data does not exist in a local cache (608). In the preferred embodiment, no explicit reply is sent to a requesting processor which, after some period of time, assumes that the data it needs cannot be found in caches of other processors. In an alternate embodiment, an explicit reply indicating that the requested data is not cached is sent to a requesting processor.

On the other hand, if the requested cache line is not associated with a page that has been invalidated, the request is processed and the data are sent to the requester as described in the prior art (610).

It is understood that the method for reducing the traffic between a cache and main memory (as described above) can also be used to reduce traffic between caches in a multi-level cache hierarchy e.g. L1 (112) and L2 (116) caches and, possibly, a write buffer between them).

It is also understood that one or more memory traffic saver devices mentioned above can be implemented in a system. A memory traffic saver device does not have to be coupled with all of the following devices: a write buffer, a cache controller, a coherence controller. It can be coupled with only a subset of them.

In addition, the buffer and a memory traffic saver device can be made multi-ported to perform more than one lookup at a time.

In an alternate embodiment, the entire cache is scanned periodically (or whenever a new entry is added to an invalid page ID buffer) and the content of a cache line containing useless data is invalidated immediately without waiting for that line to be referenced or allocated for some new data.

While it is apparent that the invention herein disclosed is well calculated to fulfill the objects stated above, it will be appreciated that numerous modifications and embodiments may be devised by those skilled in the art, and it, is intended that the appended claims cover all such modifications and embodiments as fall within the true spirit and scope of the present invention.

What is claimed is:

1. Apparatus for managing traffic in a memory subsystem, comprising:

a controller for receiving a request to transmit data from a first memory subsystem component to a second memory subsystem component; and a processor subsystem for determining if the requested data is associated with a memory portion that has been marked as containing useless data, said useless data including valid useless data; and wherein if the requested data is associated with a memory portion that has been marked as containing useless data, the controller does not transmit the requested data from the first memory subsystem component to the second memory subsystem component to reduce traffic in the memory subsystem.

2. Apparatus according to claim 1, wherein:

the processor subsystem includes a buffer for identifying one or more memory portions that have been marked as containing useless data; and in response to receiving the request, the processor subsystem checks said buffer to determine if the requested data corresponds to a memory portion that is identified in the buffer as containing useless data.

3. Apparatus according to claim 1, wherein the processor subsystem further includes a memory traffic saver to compute a memory portion identifier and to determine if the computed memory portion identifier is in said buffer.

4. Apparatus according to claim 1, wherein:
the first memory subsystem component is a write buffer; and
the second memory subsystem component is a main memory.

5. Apparatus according to claim 1, wherein:
the first memory subsystem component is a write buffer; and
the second memory subsystem component is a cache.

6. An apparatus according to claim 1, wherein:
the first memory subsystem component is a cache; and
the second memory subsystem component is a write buffer.

7. An apparatus according to claim 1, wherein:
the first memory subsystem component is a cache; and
the second memory subsystem component is another cache.

8. An apparatus according to claim 1, wherein:
the first memory subsystem component is a cache; and
the second memory subsystem component is a main memory.

9. An apparatus according to claim 1, wherein:
the first memory subsystem component is a cache; and
the second memory subsystem component is a coherence controller managing the cache and managing traffic between processors in a multiprocessor system.

10. An apparatus according to claim 1, wherein the memory portion is a page.

11. An apparatus according to claim 1, wherein the requested data is invalidated in the first memory subsystem component.

12. An apparatus according to claim 1, wherein the requested data is removed from the first memory subsystem component.

13. An apparatus for managing cache lines in a cache, comprising:
means for receiving a request to evict a cache line from a particular cache set;
means for determining if any cache line within said cache set is associated with a memory portion marked as containing useless data, said useless data including valid useless data;
means for evicting a cache line, if the cache line is within said cache set and is associated with a memory portion marked as containing useless data, before evicting another cache line with useful data to reduce traffic in the memory subsystem.

14. Apparatus for managing entries in a memory subsystem component, comprising:
means for scanning through entries in a memory subsystem component;
means for determining if any entry in said memory subsystem component is associated with a memory portion marked as containing useless data, said useless data including valid useless data; and
means for freeing an entry in said memory subsystem component if the entry is associated with a memory portion marked as containing useless data.

15. Apparatus according to claim 14, wherein the freeing means includes one or more of the following:
means for removing an entry from a memory subsystem component;
means for invalidating an entry in a memory subsystem component.

16. A method of managing traffic in a memory subsystem, comprising the steps:
receiving a request to transmit data from a first memory subsystem component to a second memory subsystem components;
determining if the requested data is in a memory portion that has been marked as containing useless data, said useless data including valid useless data; and
if the requested data is in a memory portion that has been marked as containing useless data, then not transmitting the requested data from the first memory subsystem component to the second memory subsystem component to reduce traffic in the memory subsystem.

17. A method according to claim 16, wherein the determining step includes the steps of:
maintaining a buffer identifying one or more memory portions that have been marked as containing useless data; and
in response to receiving the request, checking said buffer to determine if the requested data corresponds to a memory portion that is identified in the buffer as containing useless data.

18. A method according to claim 17, wherein the checking step includes the step of using a memory traffic saver to compute a memory portion identifier and to determine if the computed memory portion identifier is in said buffer.

19. A method according to claim 16, wherein the requested data is invalidated in the first memory subsystem component.

20. A method of managing cache lines in a cache, comprising the steps:
receiving a request to evict a cache line from a particular cache set;
determining if any cache line within said cache set is in, a memory portion marked as containing useless data, said useless data including valid useless data;
if there is a cache line within said cache set that is in a memory portion marked as containing useless data, then evicting said cache line before evicting another cache line with useful data to reduce traffic in the memory subsystem.

21. A method of managing entries in a memory subsystem component, comprising the steps:
scanning through entries in a memory subsystem component;
determining if any entry in said memory subsystem component is in a memory portion marked as containing useless data said useless data including valid useless data;
if there is an entry in said memory subsystem component that is in a memory portion marked as containing useless data, then freeing said entry.

22. A method according to claim 21, wherein the freeing step includes one or more of the following:
removing an entry from a memory subsystem component;
invalidating an entry in a memory subsystem component.

23. A program storage device readable by machine, tangibly embodying a program of instructions executable by the machine to perform method steps for managing traffic in a memory subsystem, said method steps comprising:
receiving a request to transmit data from a first memory subsystem component to a second memory subsystem component;
determining if the requested data is associated with a memory portion that has been marked as containing useless data, said useless data including valid useless data; and if the requested data is associated with a memory portion that has been marked as containing useless data, not transmitting the requested data from the first memory subsystem component to the second memory subsystem component to reduce traffic in the memory subsystem.

24. A program storage device according to claim 23, wherein the determining step includes the steps of:

maintaining a buffer identifying one or more memory portions that have been marked as containing useless data: and in response to receiving the request, checking said buffer to determine if the requested data corresponds to a memory portion that is identified in the buffer as containing useless data.

25. A program storage device according to claim 23, wherein the checking step includes the step of using a memory traffic saver to compute a memory portion identifier and to determine if the computed memory portion identifier is in said buffer.

* * * * *

UNITED STATES PATENT AND TRADEMARK OFFICE
CERTIFICATE OF CORRECTION

PATENT NO. : 6,643,741 B1
DATED : November 4, 2004
INVENTOR(S) : Yefim Shuf et al.

It is certified that error appears in the above-identified patent and that said Letters Patent is hereby corrected as shown below:

Column 3,
Line 5, "buffer. (IPIDB)" should read -- buffer (IPIDB) --

Column 4,
Line 24, "above identified" should read -- above-identified --

Column 5,
Line 64, "(130)" should read -- (130)) --

Signed and Sealed this

Twenty-first Day of June, 2005

JON W. DUDAS
*Director of the United States Patent and Trademark Office*